US011634886B2

(12) United States Patent
Krivenkov et al.

(10) Patent No.: US 11,634,886 B2
(45) Date of Patent: Apr. 25, 2023

(54) MANUALLY OPERABLE CONTROL DEVICE

(71) Applicant: GRAMMER AG, Amberg (DE)

(72) Inventors: Konstantin Krivenkov, Amberg (DE); Andreas Nutz, Amberg (DE)

(73) Assignee: GRAMMER AG, Ursensollen (DE)

( * ) Notice: Subject to any disclaimer, the term of this patent is extended or adjusted under 35 U.S.C. 154(b) by 423 days.

(21) Appl. No.: 16/891,274

(22) Filed: Jun. 3, 2020

(65) Prior Publication Data

US 2020/0385956 A1 Dec. 10, 2020

(30) Foreign Application Priority Data

Jun. 6, 2019 (DE) ..................... 10 2019 115 329.8

(51) Int. Cl.
*E02F 9/20* (2006.01)
*G05G 1/04* (2006.01)
(Continued)

(52) U.S. Cl.
CPC ............. *E02F 9/2004* (2013.01); *G05G 1/04* (2013.01); *G05G 5/03* (2013.01); *G05G 5/05* (2013.01);
(Continued)

(58) Field of Classification Search
CPC ........... E02F 9/2004; G05G 1/04; G05G 5/03; G05G 5/05; G05G 5/16; G05G 9/047;
(Continued)

(56) References Cited

U.S. PATENT DOCUMENTS 5,680,797 A 10/1997 Elsaesser
6,002,351 A 12/1999 Takeda et al.
(Continued)

FOREIGN PATENT DOCUMENTS

CN 1179218 4/1998
CN 103186163 7/2013
(Continued)

OTHER PUBLICATIONS

Official Action for German Patent Application No. DE 102019115329.8, dated Feb. 14, 2020, 3 pages.
(Continued)

*Primary Examiner* — Jeremy R Severson
(74) *Attorney, Agent, or Firm* — Sheridan Ross P.C.

(57) ABSTRACT

The invention relates to a manually operable control device for operating at least one actuator of a vehicle, comprising a manually operable control lever element which can be displaced from a default position by means of a rotation about a first axis and/or about a second axis, wherein a degree and/or a direction of a corresponding displacement of the control lever element can be detected by means of a sensor device, further comprising at least a first actuator device with a first drive unit and a first output unit, wherein, by means of the first actuator device, the first axis can be acted upon with a first torque, a second actuator device with a second drive unit and a second output unit, wherein, by means of the second actuator device, the second axis can be acted upon with a second torque, wherein the first output unit is rotatably mounted about the first axis and the second output unit rotatably mounted about the second axis.

11 Claims, 11 Drawing Sheets

(51) Int. Cl.

| | |
|---|---|
| ***G05G 5/05*** | (2006.01) |
| ***G05G 5/16*** | (2006.01) |
| ***G05G 9/047*** | (2006.01) |
| ***G05G 5/03*** | (2008.04) |

(52) U.S. Cl.
CPC ............... *G05G 5/16* (2013.01); *G05G 9/047* (2013.01); *G05G 2009/04718* (2013.01); *G05G 2009/04748* (2013.01); *G05G 2009/04766* (2013.01); *G05G 2505/00* (2013.01)

(58) Field of Classification Search
CPC .......... G05G 2009/04718; G05G 2009/04748; G05G 2009/04766; G05G 2505/00
See application file for complete search history.

(56) References Cited

U.S. PATENT DOCUMENTS

| | | | | |
|---|---|---|---|---|
| 6,536,298 | B1 | 3/2003 | Bellur et al. | |
| 8,100,030 | B2 * | 1/2012 | Koschke | B62D 1/12 74/484 R |
| 2009/0146018 | A1 | 6/2009 | Konig | |
| 2013/0162419 | A1 | 6/2013 | Chang et al. | |
| 2013/0252781 | A1 * | 9/2013 | Hagedorn | F16H 1/46 475/337 |
| 2014/0251070 | A1 * | 9/2014 | Kornelson | G05G 9/047 74/523 |

FOREIGN PATENT DOCUMENTS

| | | |
|---|---|---|
| DE | 202005015434 | 2/2007 |
| EP | 1146530 | 10/2001 |
| EP | 2586702 | 5/2013 |
| FR | 3051954 | 12/2017 |
| JP | S59-3541 | 1/1984 |

OTHER PUBLICATIONS

Extended Search Report for European Patent Application No. 20177594.7, dated Oct. 14, 2020, 10 pages.

Official Action with English Translation for China Patent Application No. 202010504798.9, dated Nov. 1, 2021, 21 pages.

* cited by examiner

MANUALLY OPERABLE CONTROL DEVICE

CROSS-REFERENCE TO RELATED APPLICATIONS

This application claims the benefit of German Patent Application No. 10 2019 115 329.8 filed Jun. 6, 2019, the entire contents of which are incorporated herein by reference in its entirety.

FIELD

The invention relates to a manually operable control device for operating at least one actuator of a vehicle.

BACKGROUND

Vehicles that are equipped with multiple actuators or actuator elements are traditionally provided with a control system and control elements for controlling these actuator elements. Examples of such vehicles are a forklift, a tractor or an excavator. Examples of such actuator elements are drives which are designed hydraulically, pneumatically, electronically and/or electromechanically, for example, and which are provided for moving excavator buckets or also controllable valves. An electronic control unit that receives signals from sensors and transmits control signals to the actuator elements is generally part of the control system.

Control elements used to actively control actuator elements are known from prior art as so-called joysticks, control sticks or control lever elements, which resemble a gearchange lever of a car and which are arranged within a vehicle's cab so that they can be manually operated by the user of the vehicle (driver). These control lever elements are arranged so that they can be (pivotably and/or slidably) displaced, for example with the help the driver's muscle strength, from a starting position (default position, neutral position) to the left, right, front and/or back.

A control device is now to be developed which has several advantages. On the one hand, the displacement of the control lever element from the default position should be detectable with respect to its direction and extent. Furthermore, a control system is to be developed which is able to provide the driver with feedback about possible events and actively support the driver during the operation of the control lever element. In addition, all of these features should be implemented in a control device with a comparatively small size.

SUMMARY

The object of the invention is achieved by a manually operable control device for operating at least one actuator of a vehicle, comprising a manually operable control lever element, which can be displaced from a default position by means of a rotation about a first axis and/or about a second axis, wherein a degree and/or a direction of a corresponding displacement of the control lever element can be detected by means of a sensor. Furthermore, the manually operable control device comprises at least a first actuator device with a first drive unit and a first output unit, wherein, by means of the first actuator device, the first axis can be acted upon with a first torque as well as a second actuator device with a second drive unit and a second output unit, wherein, by means of the second actuator device, the second axis can be acted upon with a second torque, wherein the first output unit being rotatably mounted about the first axis and the second output unit being rotatably mounted about the second axis.

It has proven to be advantageous if a longitudinal extension of the control lever element is arranged perpendicular to the first and second axes at least in the default position of the control lever element. The first and second axes are preferably always arranged perpendicular to one another.

The axes about which one of the output units rotates are each aligned with one of the first or second axes. As a result, the control device has an overall compact design. Little space is required, in particular, for the arrangement of actuator elements on the side of the control device that faces away from the control lever element; this may, for example, be the underside of the control device.

Starting from the default position, the control lever element can preferably be displaced in all directions. The control lever element can thus preferably undergo a displacement about the first axis and/or about the second axis, both with regard to a positive (corresponds to a forward rotation) and a negative rotation (corresponds to a backward rotation) about the respective axis. Furthermore, a superposition of the described displacements is preferably possible. All of the above-mentioned displacing movements are also preferably possible in a continuous manner.

The degree and/or the direction of the displacement of the control lever element can preferably be detected by means of a sensor such as a magnetic sensor or a Hall sensor. This sensor is located, for example, on the side of the control device that faces away from the control lever element. From the driver's perspective, this is, for example, the underside of the control device.

The drive unit of the first and/or the second actuator device preferably also rotates about the same axis as the associated output unit. The drive unit and the output unit therefore preferably do not form an angular gear with one another.

A motor comprising the drive unit is preferably provided in each case. In particular, it is preferred that the first actuator device and the second actuator device each form a motor/gear combination with each comprising the first or second output unit designed as a planetary gear and the first or second drive unit designed as an electric motor. This electric motor is preferably a torque motor, which means that it preferably has a comparatively high torque at comparatively low revolution speeds.

The electric motor comprises a stator and a rotor, for example. A nominal torque of this motor has, for example, a value ranging from 0.2 Nm to 0.5 Nm, preferably 0.3 Nm. This nominal torque corresponds to the driving torque.

The planetary gear has, for example, a gear transmission ratio ranging from 5 to 10, preferably 7.

As is known, the output torque can be calculated as the product of the driving torque and the gear transmission ratio. With the preferred values for the driving torque and for the gear transmission ratio, an output torque of 7×0.3 Nm, i.e., 2.1 Nm, can be achieved. This output torque can therefore act on each of the first and the second axis.

By means of the actuator devices described, it is now possible to control the control lever element indirectly, namely by controlling one or both of the first and second axes in an active or programmed manner, which means that a force or a torque can be applied to the control lever element without using the driver's muscle strength. This method is also known as "force feedback."

It should be mentioned that the present application uses the term "actuator element" when referring to the above-mentioned drive units of the vehicle itself (motor for excavator bucket, etc.). On the other hand, the drive units of the control device are each referred to as an "actuator device" in the context of the present invention.

By means of the arrangement of the actuator devices, for example, the driver can be provided with feedback about possible events, for example when a collision of one of the actuator elements (excavator bucket) with a hard object is detected by a further sensor.

Thus, a force and/or a torque can be transmitted to the control lever element by means of the control device, namely by means of at least one of the actuator devices, which results, for example, in a vibration and/or displacement of the control lever element. For the purposes of the present invention, a vibration is a chronological sequence of small displacements.

Likewise, a programmable and/or predefined sequence of forces and/or torques can be transmitted to the control lever element by means of at least one of the actuator devices, which results, for example, in a sequence of movements by the control lever element. In addition, the at least one actuator device can support the control lever element in the return to its default position.

The control device preferably comprises an electronic control unit (also referred to as a "CU" or "Control Unit") by means of which signals can be transmitted to both electric motors; these signals are preferably control signals. Signals from sensors can preferably be received by means of the electronic control unit, which the sensors record various vehicle parameters (acceleration, temperature, force, pressure, force/load, position/height/path, angle position and/or speed, etc., each relating to different components).

It is therefore possible to transmit programmed movement sequences to the control lever element by means of the actuator devices. It is also conceivable, for example, that the excavator operator carries out other work while the excavator bucket, for example, repeatedly and automatically moves up and down. For the purposes of the present invention, this is also referred to as a "position-dependent torque specification."

The driver can also be warned of a possible unknown danger in that at least one of the actuator devices, by applying a force and/or a torque, causes the control lever element to vibrate and/or blocks a movement of the control lever element in at least one direction. For the purposes of the present invention, this is also referred to as an "event-related torque specification."

An application example for the "event-related torque specification" pertains to the case in which the driver hits a stationary obstacle with the excavator bucket being moved by the control lever element, whereupon the displacement/movement of the excavator bucket is stopped. If the excavator driver continues to push the control lever element in the same direction, the electronic control unit recognizes, for example, that the force for performing this movement by means of the associated actuator element continues to increase until it finally exceeds a predetermined upper limit. The control system then sends, for example, a command to at least one of the actuator devices to apply a force and/or a torque to the respective axis in order to counteract the muscle strength of the excavator operator with an active force and block, for example, the movement in the direction toward the obstacle that is harmful to the excavator bucket. It is also conceivable in this regard to only use a vibration movement or an additional vibration movement of the control lever element to warn the excavator operator.

Furthermore, there are movement sequences performed by the control lever element that are, at least partly, associated with a great expenditure of force by the driver. Here, the actuator devices can assist the driver by providing additional forces and/or torques.

A system with a 4-quadrant operation is thus configured to include the control device described. This is generally understood to refer to a system that is capable of controlling the speed and the torque in a positive and negative direction. The operation in quadrants 1 and 3 is called a "motor" operation because speed and torque have the same sign (both are positive or both are negative). This is the case, the motor consumes energy when a load is driven. The operation in quadrants 2 and 4 is called a "dynamic" operation, which means that speed and torque have opposite directions (one negative and the other positive). This is the case when the motor brakes the load and generates electrical energy in doing so.

In addition, the control lever element can be blocked by means of the actuator devices at least with respect to the rotation about an axis or about both axes.

Both actuator devices, both drive units and/or both output units are preferably configured identically, at least with regard to the hardware used. The use of the same components increases their lot size in the calculation, which generally has a positive effect on the price.

It is advantageous for the realization of a compact design of the control device if the first and/or second output unit configured with the planetary gear comprises a rotatably mounted sun gear, an annulus gear radially surrounding the sun gear and multiple, preferably three, planet wheels, which are radially arranged between and intermeshed with the sun gear and the annulus gear. The sun gear is preferably arranged in alignment with either the first axis or the second axis and rotatably mounted about the latter.

Unless otherwise described, the features mentioned below apply to both actuator devices.

For example the module of the sun gear, the annulus gear and the planet wheels, that is to say the ratio of the values of the respective pitch circle diameter and the respective number of teeth, has an identical value ranging from 0.3 mm to 0.7 mm, preferably 0.5 mm.

The annulus gear is preferably mounted in a stationary manner; the output is therefore preferably not provided via the annulus gear. The annulus gear has an anti-rotation device by means of which, for example, its radial position can be locked relative to the remaining part of the control device. Firstly, this anti-rotation device may, for example, be formed on the outer diameter of the annulus gear by means of a special first geometry of said annulus gear. This first geometry is designed, for example, as at least one, preferably four, flat regions on the outer radius of the annulus gear. Preferably, this anti-rotation device may secondly also be configured on the remaining part of the control device as a second geometry that is complementary to the first geometry; flat regions are, for example, also formed on an inner radius on the remaining part of the control device with their number and arrangement being preferably identical to the number of the flat regions of the annulus gear.

The actuation is preferably carried out by means of a shaft of the motor (motor shaft) and the sun gear, wherein a central axis of the shaft of the motor is preferably aligned with a central axis of the sun gear. The shaft of the motor is more preferably in mechanical engagement with the sun gear so that a torque of the motor can be transmitted to the sun gear; the shaft and the sun gear are preferably rigidly connected to one another. Thus, in particular, a rotation of the motor axis can be transferred to a rotation of the sun gear in the same direction which is identical with respect to the rotation speed. A connection between the motor shaft and the sun gear comprises, for example, a feather key connection.

It is preferred, however, if no separate connection is required between the motor shaft and the sun gear. Accordingly, the motor shaft and the sun gear are preferably designed in one piece; the motor shaft and the sun gear are, for example, made from a single part and/or a single semi-finished product and are preferably machined ("milled").

The motor shaft, as a drive shaft, is thus mounted on a side facing the control lever element via the mounting of the sun gear and ultimately via the mounting between the annulus gear and the housing. On a side facing away from the control lever element, the motor shaft is mounted in contact with the inner ring of a roller bearing, the outer ring of which is supported, for example, by means of the housing.

For example, at least one or more, preferably all, gears (sun gear, annulus gear and/or planet wheels) are made of plastic. Possible plastics here are, for example, polyacetal (POM) and/or polyketone (PK).

The control lever element is preferably mounted by means of a Cardan joint.

It has also proven to be advantageous if a first guide element is arranged at a lower end of the control lever element, said first guide element being rotatably mounted about the second axis and forming a first slotted guide, by means of which the rotation of the control lever element about the first axis can be limited to a specific first angle range.

It is also advantageous if the first guide element forms a bearing for a rotary mounting movement of the lower end of the control lever element. The first guide element has, for example, a hole through the slotted guide. The lower end of the control lever element also has a hole, for example. Both holes are preferably arranged in alignment with one another with a rod being arranged within the two holes, around which the control lever element is rotatably arranged and said rod preferably being rigidly connected to the first guide element. Thus, a rotary mounting bearing of the control lever element is provided, for example, by means of the first guide element and the rod, which further reduces the space requirement of the control device.

It is also advantageous if a second guide element is arranged between the lower end of the control lever element and an upper end of the control lever element, which is rotatably mounted about the first axis, said second guide element forming a second slotted guide, by means of which the rotation of the control lever element about the second axis can be limited to a certain second angle range.

The second guide element is preferably arranged such that it at least partially overlaps with the first guide element in the height direction of the control device. The second guide element forms, for example, an arc shape at least in some regions with a virtual central axis of the associated arc being arranged such that it intersects parallel to the second axis and/or the first guide element. This arrangement also reduces the space required.

Both guide elements are preferably mounted in the housing by means of a first and a second bearing surface. The first and/or the second bearing surface comprises, for example, a roller bearing connection.

In order to be able to transmit the forces and torques from the actuator devices to the control lever element, it is advantageous if a mechanical connection is formed between the output unit and a respective one of the guide elements. For example, the first output unit and the first guide element and/or the second output unit and the second guide element are each connected by means of a web element. This web element is made of plastic, for example. The web element is preferably formed by means of a first end of the respective guide element and/or has a rigid connection to the remaining part of the web element. The first end of the respective guide element is preferably arranged so that it faces the output unit.

It is also possible that the web element is designed as a separate component.

The web element comprises, for example, multiple of cylindrical projections, the number of which corresponds to a number of the planet wheels of the planetary gear. Each of these projections is preferably in engagement with each hole. Each of the planet wheels preferably comprises one of these holes, which are preferably arranged centrally and/or continuously throughout the respective planet wheel in an axial direction of the planet wheel. The projections and the planet wheels are preferably not rigidly connected to one another so that, in particular, the projections can still rotate within the holes of the planet wheels. Nevertheless, a circumferential force can be transferred from a rim of the holes in the planet wheels to the projections; thus, in particular, a rotation of the planet wheels about the respective first or second axis can be transferred to a rotation of the associated web element.

In order to be able to arrange some or all of the components of the manually operable control device in a position-safe and/or dust-protected manner, a multi-part housing is preferably provided, within which the first actuator device, the second actuator device, the first guide element and/or the second guide element are arranged. The multi-part housing comprises, for example, one or more parts made of die-cast metal, for example made of die-cast zinc. It is also possible for the housing to be formed by means of one or more machined parts and/or one or more sheet metal parts. The geometry, which is complementary to the geometry of the anti-rotation lock of the annulus gear, is preferably at least partially configured by means of the housing.

The housing comprises, for example, a first housing part, which forms the underside of the control device and/or represents a first support element for the first actuator device, the second actuator device, the first guide element and/or the second guide element. A second housing part is preferably arranged adjacent to the first housing part in the height direction of the control device with the second housing part preferably being arranged so that it does not overlap with the first housing part in the height direction. The first and/or the second housing part is, for example, substantially designed in the shape of a shell and/or connected to one another by means of screw connections.

As a further support element for the actuator devices and as protection against dust, a third and/or a fourth housing part is preferably provided, which is arranged to cover one of the actuator devices on a side facing away from the guide elements. The third and/or the fourth housing part is substantially plate-shaped and/or connected to the first and/or the second housing part by means of screw connections.

It is possible for a fifth housing part to be configured as a plastic part and/or arranged adjacent to the second housing part in the height direction of the control device, wherein the fifth housing part is preferably arranged so that it does not overlap with the second housing part in the height direction. The fifth housing part is substantially frame-shaped and/or connected to the second housing part by means of screw connections. The control lever element is preferably arranged to extend through a recess in the fifth housing part.

It is further preferred if at least one passive reset device is provided for the first axis and/or the second axis, which can be acted upon by a force when the control lever element is displaced, making the control lever element able to be returned to the default position by means of the force.

For example, the passive reset device comprises a torsion spring element which is arranged about the first and/or the second axis and which is connected to the first guide element and/or the second guide element; a leg spring element may, for example, serve as such a device.

Alternatively or preferably cumulatively, it may be provided that the passive reset device comprises a flat membrane element, which is preferably arranged, at least in the default position of the control lever element, perpendicular to a longitudinal extension of the control lever element and which is preferably connected to the housing and the lower end of the control lever element in a biased manner.

It is also preferred that a locking device is arranged, which can be brought into engagement with the control lever element and by means of which a displacement of the control lever element about at least one of the axes can be mechanically limited. The position of the locking device is preferably designed to be adjustable. The locking device forms, for example, an adjustment member for the displacement of the control lever element, which is preferably arranged in a plane parallel to the first and second axes. The locking device may, for example, be movably arranged within this plane, preferably movable along the first and/or the second axis.

The locking device can, for example, be brought into engagement with a first locking element for the first axis and/or with a second locking element for the second axis. The first and/or the second locking element is designed, for example, as a locking lug, i.e. it is provided with a projection, which can be brought into engagement with the locking device, in particular with the adjustment member of the locking device. The first and/or the second locking element is arranged, for example, at a second end of the respective guide element with the second end facing away from the output unit.

The locking device is arranged, for example, above the first and/or the second guide element. The adjustment member is designed in the form of a square. By shifting the locking device in the direction of one or both of the first and second axes, the adjustment member and thus the possible displacement path of the control lever element shifts as well.

Accordingly, for example, the default position of the control lever element is designed to be adjustable.

The default position of the control lever element can also be adjusted by means of a torque specification for one or both actuator devices by forcing the control lever element to return to a default position that has changed from the original default position. Starting from this changed default position, the control lever element can then be displaced as described above.

BRIEF DESCRIPTION OF THE DRAWINGS

Further advantages, objectives and characteristics of the present invention are illustrated by way of the accompanying drawings and the following descriptions, which show and describe a control device by way of example.

In the drawings.

DETAILED DESCRIPTION

Figure 1:
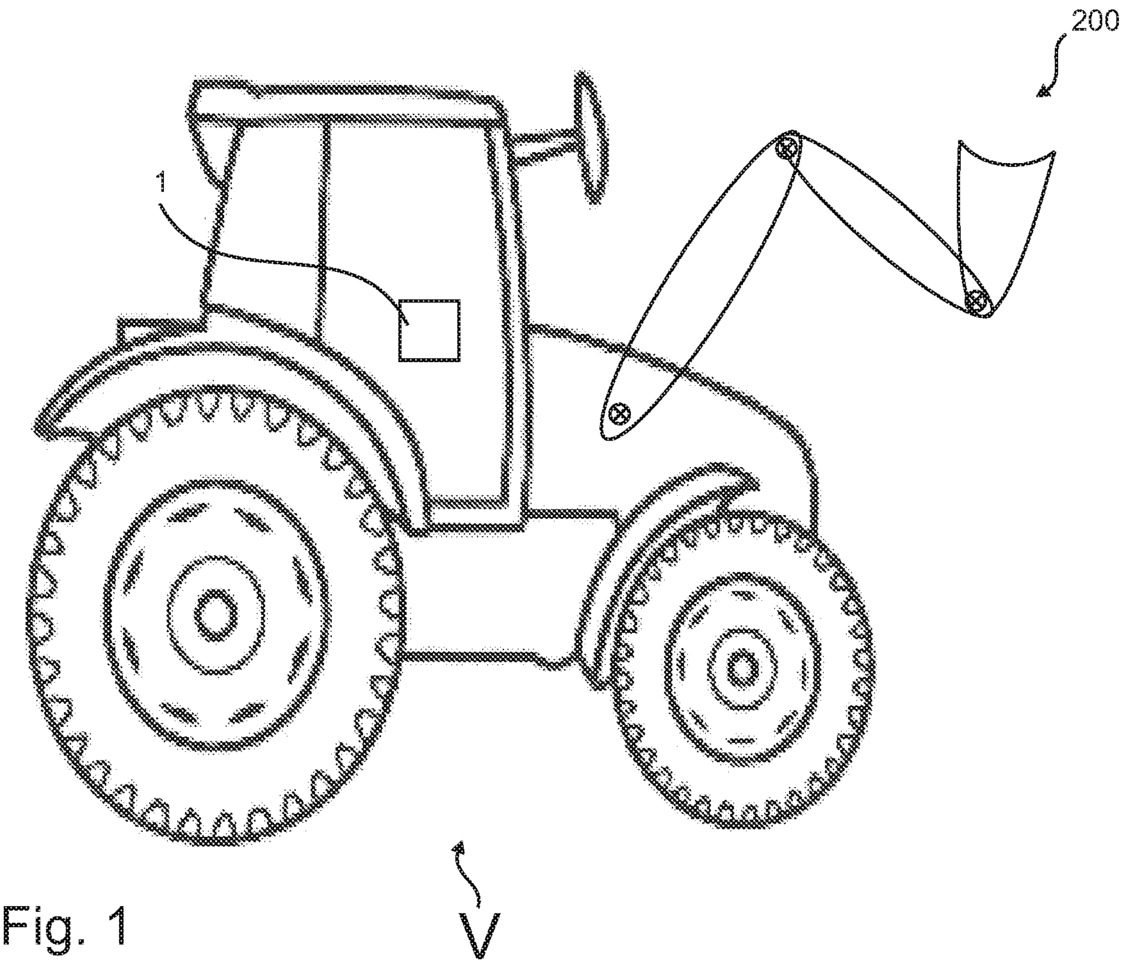
FIG. 1 shows an example of a vehicle with a control device and an actuator element according to the invention.

FIG. 1 shows an example of a vehicle V, which comprises a control device 1 for operating at least one actuator 200 of the vehicle V, which is arranged inside a driver's cab and which can be operated manually. In this example, the vehicle V is a tractor, and the actuator 200 is the drive (not shown in more detail) used to pivot a front loader bucket as seen in the figure.

Where appropriate, a Cartesian coordinate system with the longitudinal direction 1*x*, the width direction 1*y* and the height direction 1*z* of the control device 1 is shown in the following figures for purposes of better orientation. It is also possible that individual components were hidden to improve clarity. FIG. 3*b* shows, for example, only some housing parts 91, 93, 94 of the housing 90.

Figure 2A:
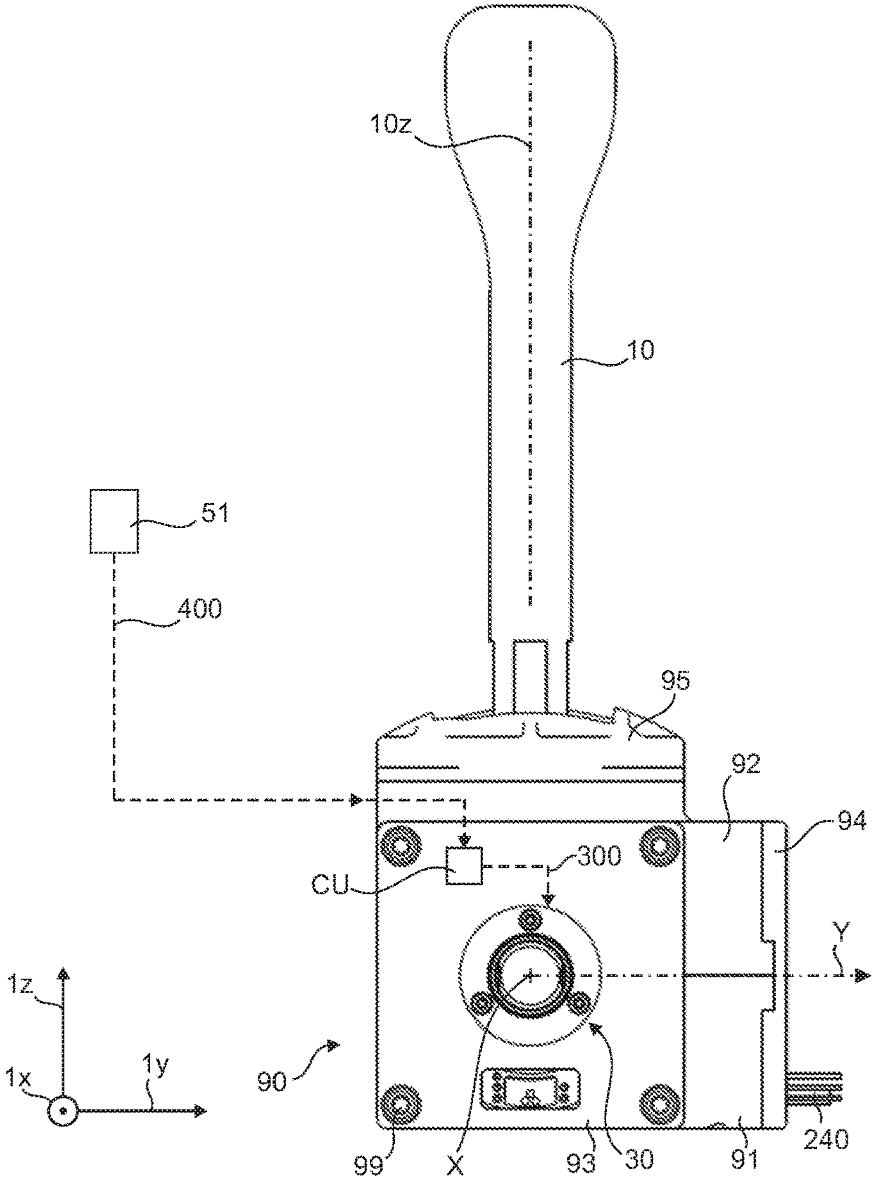
FIGS. 2*a*, 2*b*, 2*c*, 2*d* show different views of a first embodiment of the control device according to the invention.
Figure 2B:
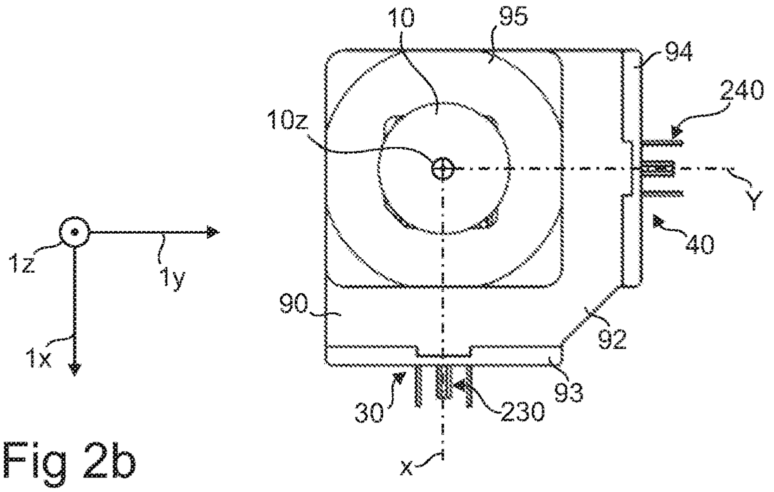
Figure 2C:
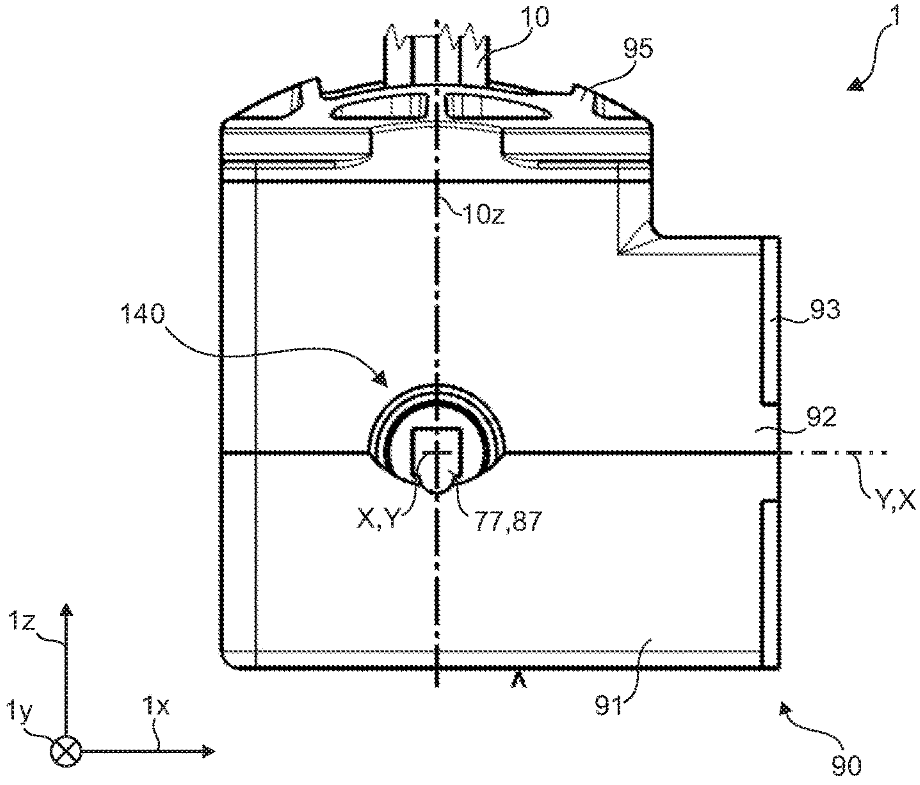

FIGS. 2*a* and 2*c* each show a side view of the control device 1, according to the invention, with a control lever element 10 as well as the first axis X and the second axis Y. A housing 90 and electrical connections 230, 240 for supplying power to the actuator devices 30, 40 are marked as well.

Figure 2D:
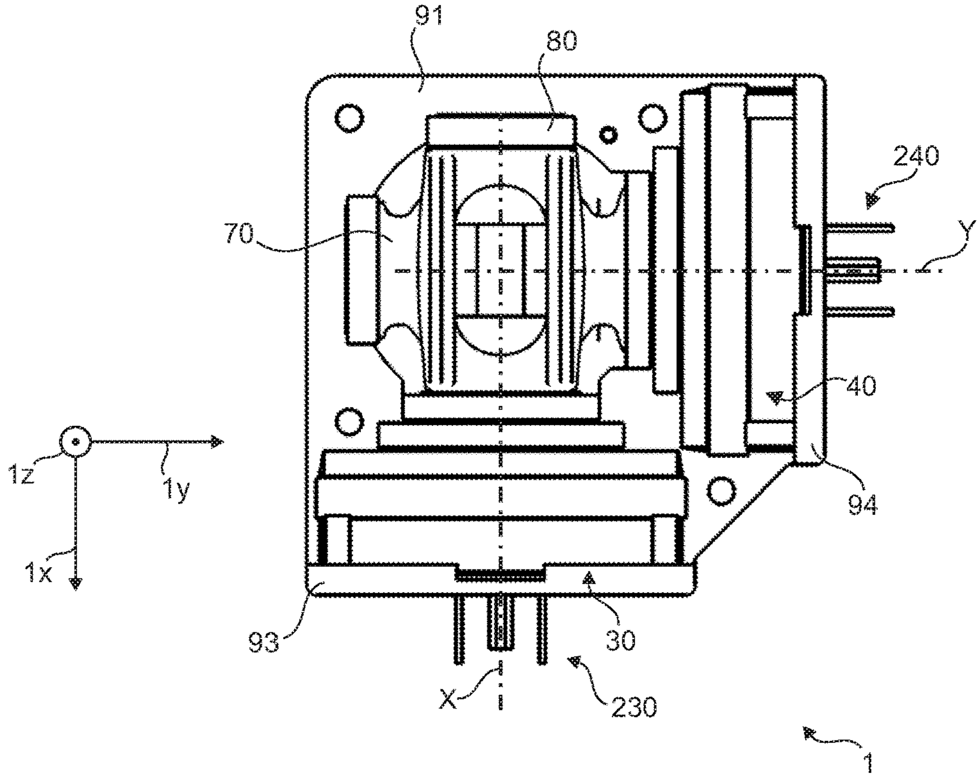

FIG. 2*c* shows the control device 1 from above. FIG. 2*d* also shows the control device 1 from above; for more clarity, however, the control lever element 10, the second housing part 92 and the fifth housing part 95 are hidden.

In the present invention, a longitudinal extension of the control lever element 10 is arranged perpendicular to the first axis X and the second axis Y, at least in the default position P0 of the control lever element 10. In addition, the first axis X and the second axis Y are also arranged perpendicular to one another in the present invention.

Figure 3A:
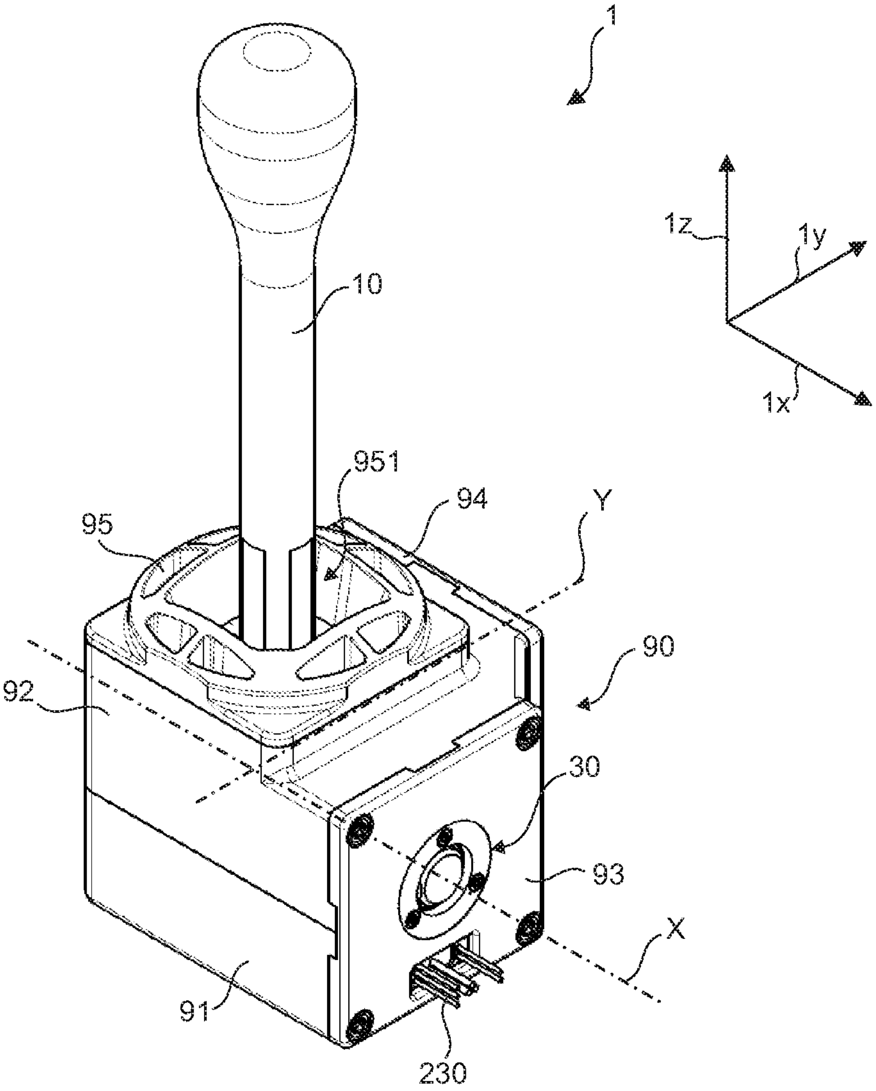
FIGS. 3*a*, 3*b* show different perspective views of the first embodiment.
Figure 3B:
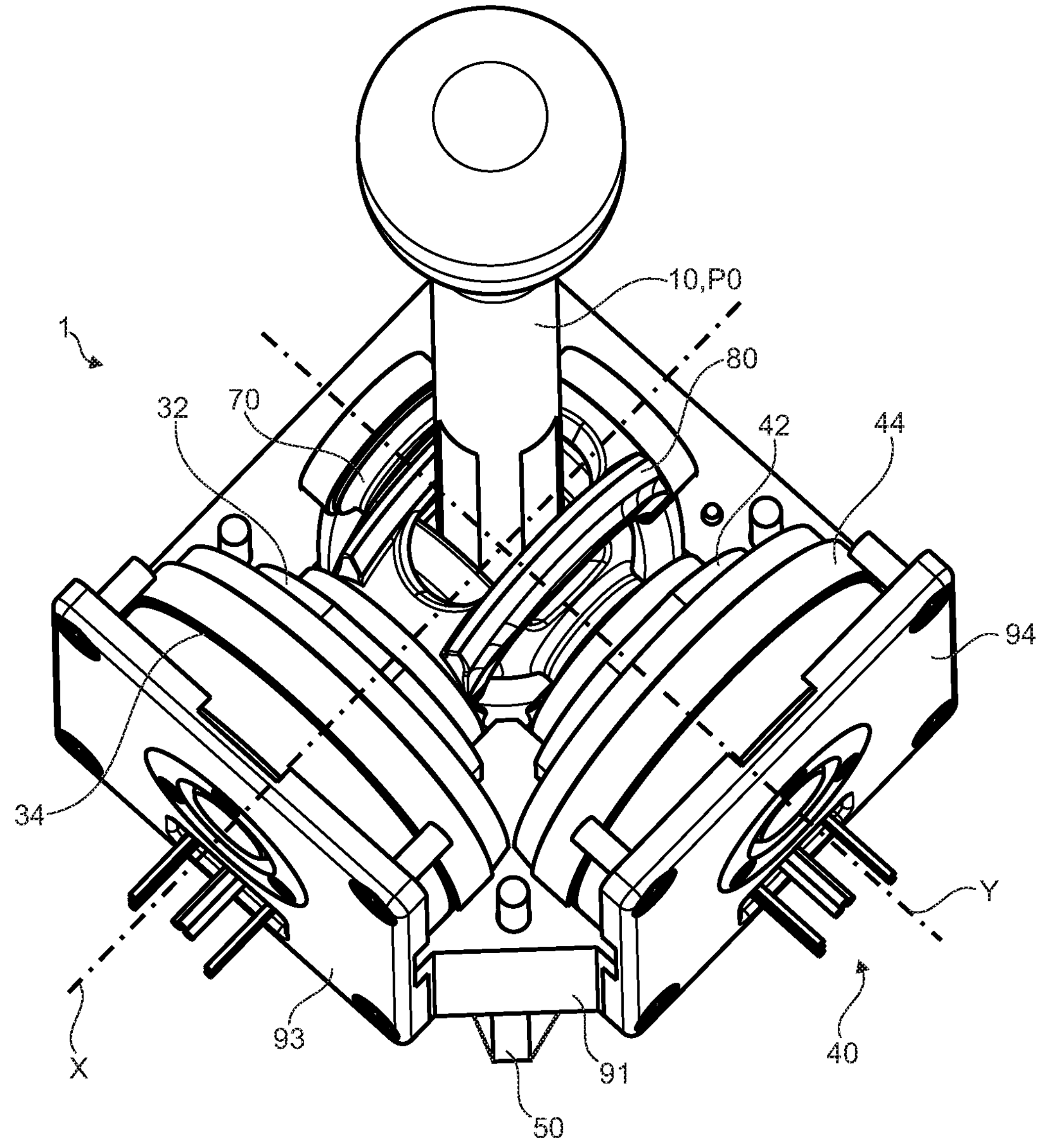

FIG. 3*a* shows a perspective view of the control device 1.

FIG. 3*b* shows a perspective view as well in which parts of the housing 90 were hidden, however. The figure shows the manually operable control device 1 for operating at least one actuator 200 of a vehicle V that comprises a manually operable control lever element 10. Starting from a default position P0 shown, this control lever element 10 can be displaced by means of a rotation about a first axis X and a second axis Y. In the present invention, these axes X, Y are virtual axes.

A degree and a direction of a relevant displacement of the control lever element 10 can be detected by means of a sensor 50. In the present invention, this sensor 50 is configured as a Hall sensor and located on the side of the control device 1 that faces away from the control lever element 10, i.e. in the present invention, it is, from the driver's perspective, located on an underside of the control device 1 (refer to the schematic illustration according to FIG. 3*b*).

Also, the control device 1 comprises a first actuator device 30 with a first drive unit 34 and a first output unit 32, wherein the first axis X can be acted upon by a first torque by means of the first actuator device 30 and a second actuator device 40 with a second drive unit 44 and a second output unit 42, wherein the second axis Y can be acted upon by a second torque by means of the second actuator device 40.

The first output unit 32 is rotatably mounted about the first axis X, and the second output unit 42 is rotatably mounted about the second axis Y. The axis about which one of the output units 30, 40 rotates is therefore aligned with one of the first X axis or the second axis Y.

In the present invention, the drive unit 34 or 44 also rotates about the same axis as the associated output unit 32 or 42. In the present invention, therefore, the drive unit 34 or 44 and the output unit 32 or 42 therefore do not form an angular gear with one another.

Both actuator devices 30, 40, both drive units 34, 44 and both output units 32, 42 are each configured identically.

As shown, the first actuator device 30 and the second actuator device 40 each form a motor/gear combination with each comprising the first 32 or the second output unit 42 designed as a planetary gear 60 and the first 34 or second drive unit 44 designed as an electric motor 150.

In the present invention, each electric motor 150 is a torque motor with a nominal torque of 0.3 Nm. In the present invention, the planetary gear has a gear ratio of 7. Thus, an output torque of 2.1 Nm is realized in the present invention.

By means of the actuator devices 30, 40 described, it is now possible to control the control lever element 10 indirectly, namely by controlling one or both of the first axis X and the second axis Y in an active or programmed manner, a method which is also known as "Force Feedback."

In the present invention, the control device 1 comprises an electronic control unit CU (refer to the schematic representation in FIG. 2*a*) by means of which output signals 300 (control signals) can be transmitted to both electric motors 150 and by means of which input signals 400 from a sensor 51 can be received (refer to the example in FIG. 2*a*). The sensor 51 is, for example, an acceleration sensor, which is designed to measure the acceleration of the actuator 200.

Figure 3C:
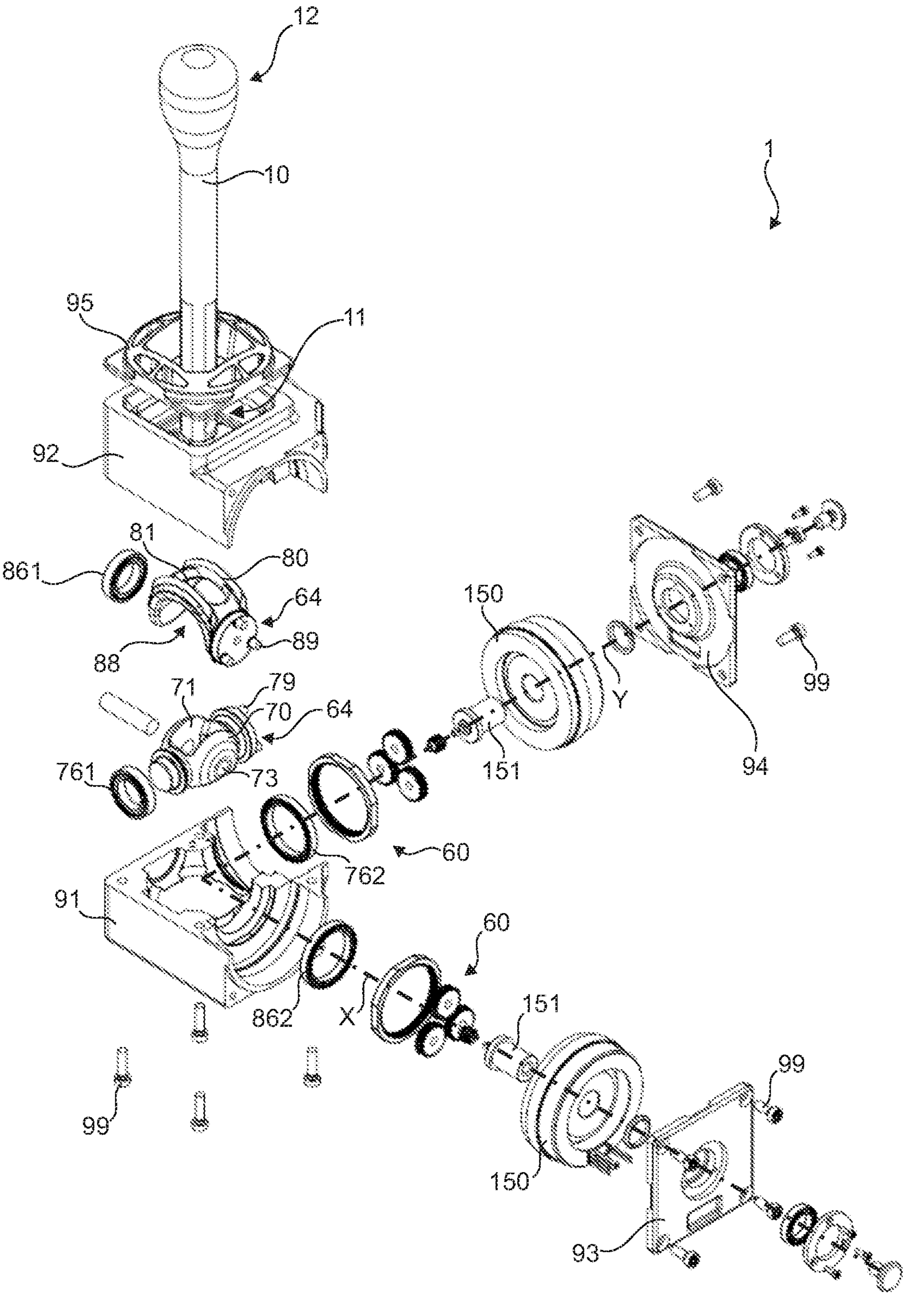
FIG. 3*c* shows an exploded view of the first embodiment.
Figure 3D:
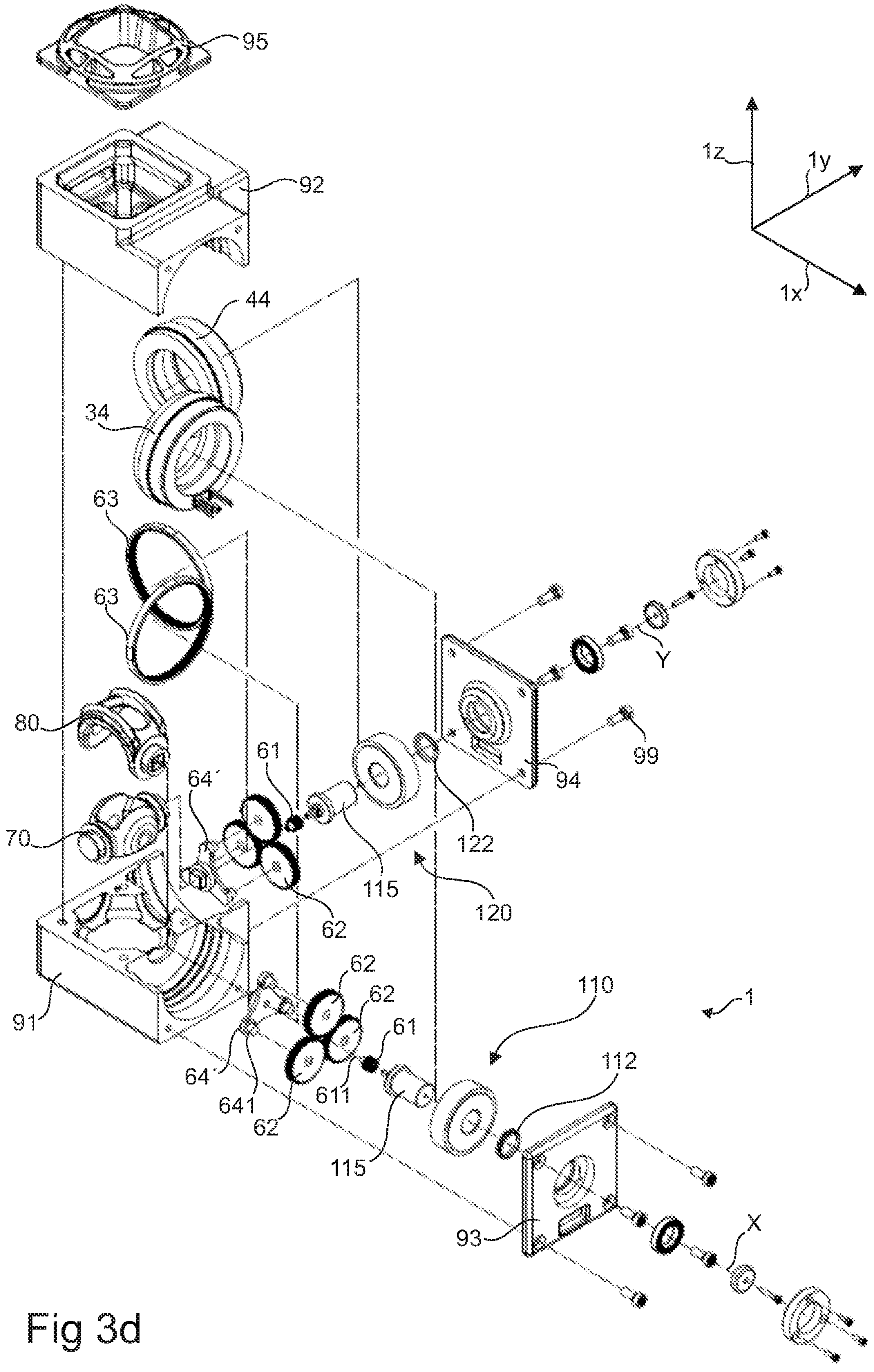
FIG. 3*d* shows an exploded view of a second embodiment of the control device according to the invention.
Figure 6A:
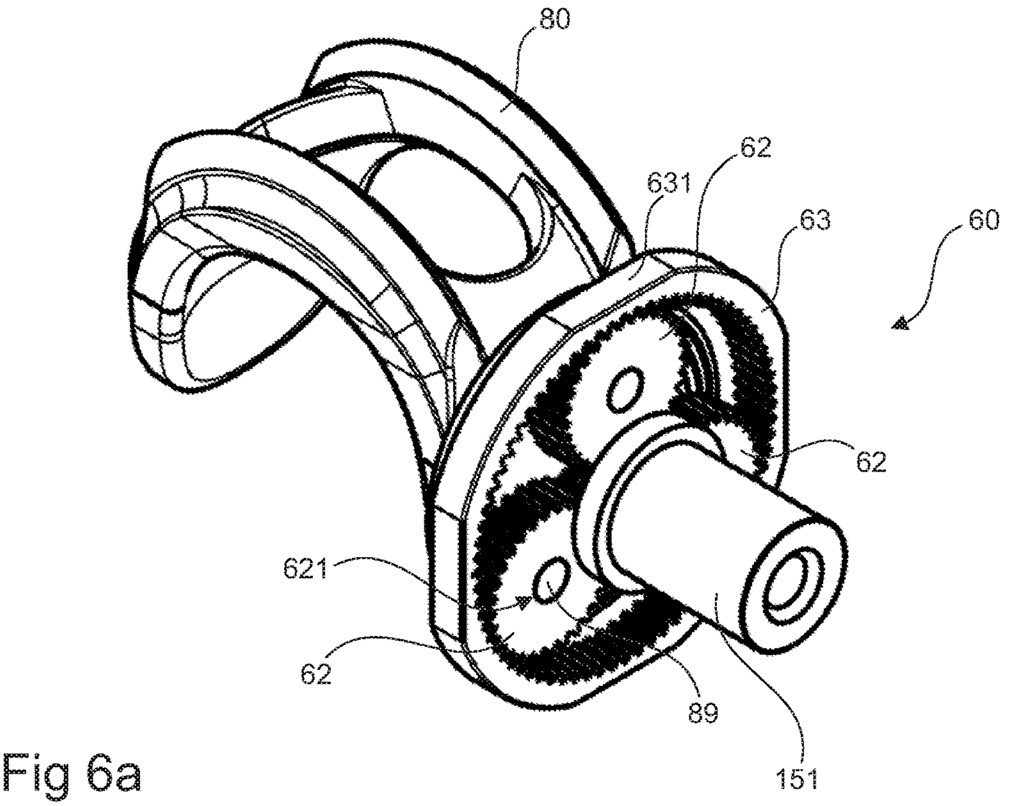
FIG. 6*a* shows a perspective view of parts of an actuator device of the second embodiment.
Figure 6B:
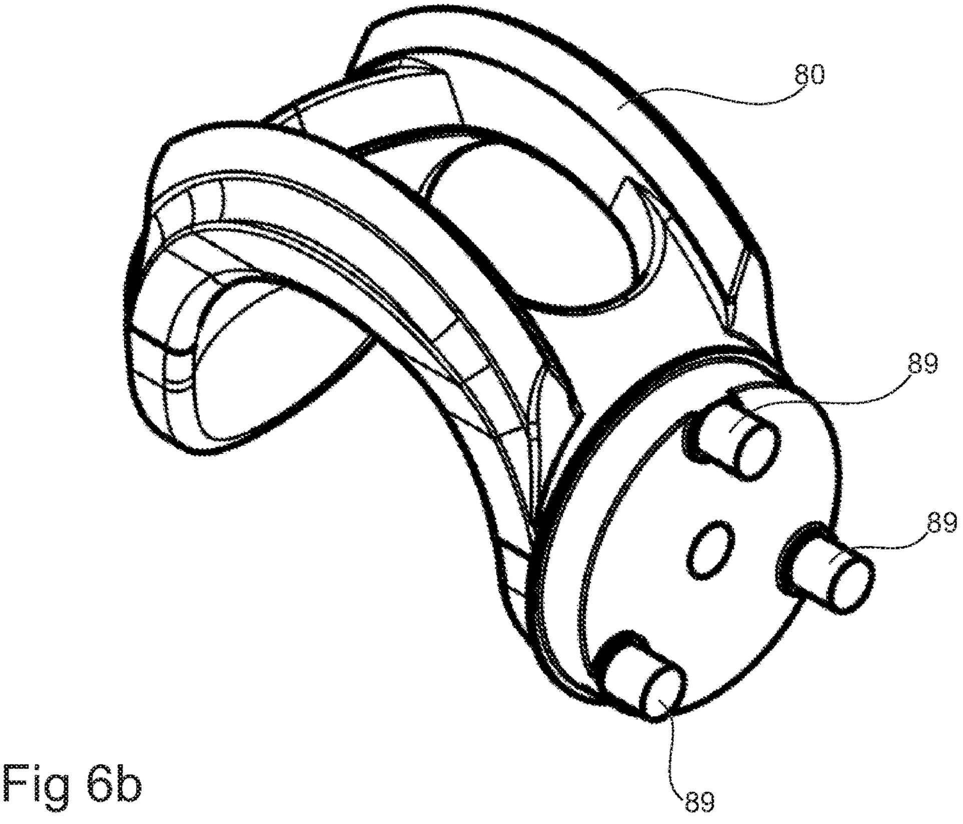
FIG. 6*b* shows a perspective view of a guide element.

FIGS. 3*d* and 6*a* also show that the planetary gear 60, which is configured by means of the first 32 and/or second output unit 42 in the present invention, has a rotatably mounted sun gear 61 (as seen in FIG. 3*d*), an annulus gear 63 radially surrounding the sun gear 61 and three planet wheels 62, which are radially arranged between and intermeshed with the sun gear 61 and the annulus gear 63. In the present invention, the sun gear 61 is aligned with one of the first axis X or second axis Y and rotatably mounted about the latter.

Figure 4A:
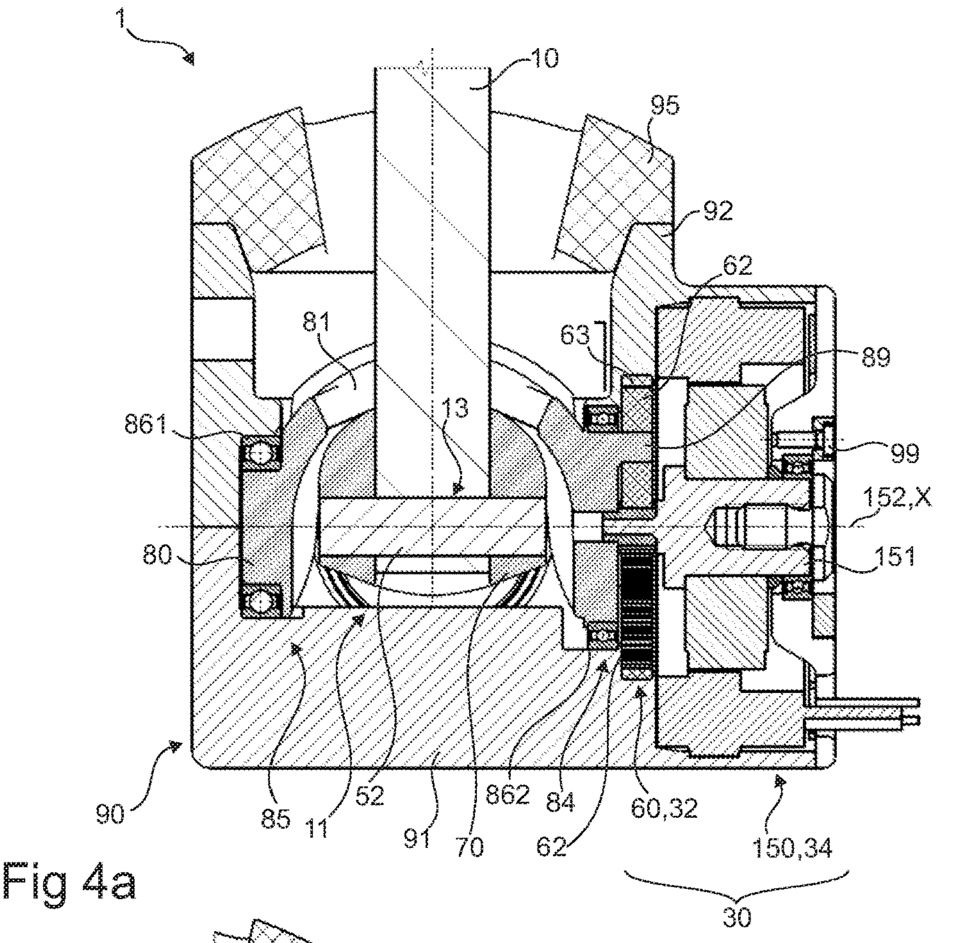
FIGS. 4*a*, 5*a*, 5*b* show different cross-sectional views of the first embodiment.
Figure 4B:
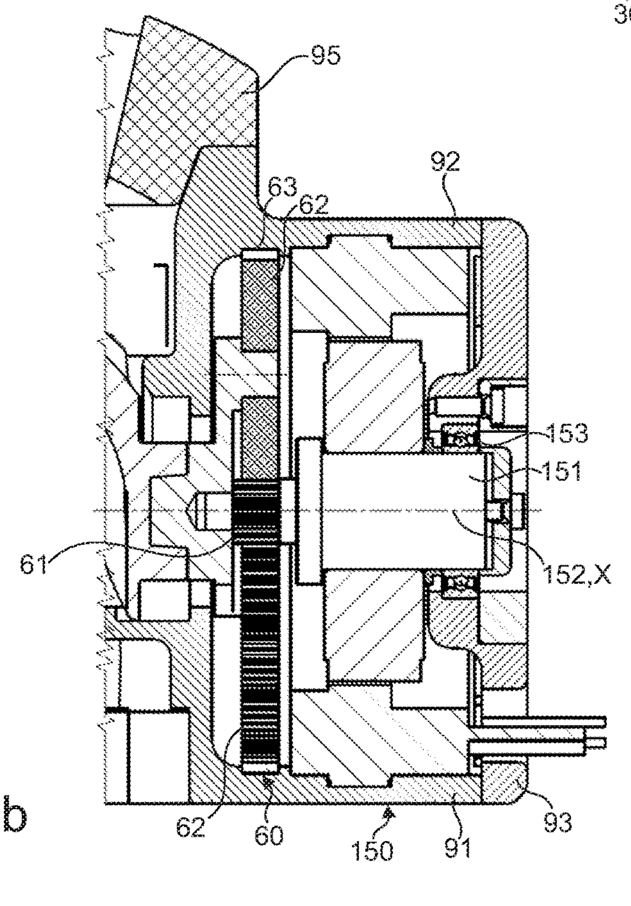
FIG. 4*b* shows a cross-sectional view of the second embodiment.

In contrast to the other figures, FIGS. 3*d* and 4*b* show a second embodiment of the present control device 1, according to which a separate web element 64' is arranged for connecting the planet wheels 62 with the guide elements 70, 80.

FIGS. 3*c*, 6*a*, 6*b*, 5*a* and 4*a*, however, show examples in which such projections 89 are arranged on the second guide element 80, said projections 89 also engaging in the holes 621 of the planet wheels 62 of the other planetary gear 60 (detailed description below). In the present invention, such projections 79 are also arranged on the first guide element 70 (refer to FIG. 3*c*). The web element 64 according to the first embodiment is thus configured to be part of the guide elements 70 and 80.

In the present invention, both guide elements 70, 80 are mounted in the housing 90 by means of a first 761, 861 and a second bearing 762, 862 by means of a roller bearing connection (refer, in particular, to FIGS. 3*c* and 4*a*).

In the present invention, a module of the sun gear 61, the annulus gear 63 and the planet wheels 62 each has an identical value of 0.5 mm.

In the example shown, the annulus gear 63 is mounted in a stationary manner; the output is therefore not provided via the annulus gear 63. In the present invention, the annulus gear 63 has an anti-rotation device by means of which its radial position can be locked relative to a remaining part of the control device 1. In the present invention, this anti-rotation device is firstly formed by means of a special geometry of the annulus gear 63 on its outer diameter; this special geometry consists of four flat regions 631 on the outer radius of the annulus gear 63. According to FIG. 5*a*, it is shown that this anti-rotation device is secondly configured as a geometry on the housing 90 that is complementary to the geometry of the annulus gear 63, which in the present invention consists of one of four flat regions 901 on an inner radius of the housing 90.

FIGS. 3*a* and 3*c*, in particular, show that the housing 90 in the present invention comprises a first housing part 91 which forms the underside of the control device 1 and provides a first support element for the first actuator device 30, the second actuator device 40, the first guide element 70 and the second guide element 80. Likewise, a second housing part 92 is arranged adjacent to the first housing part 91 in the height direction 1*z* of the control device 1, with the second housing part 92 preferably being arranged so that it does not overlap with the first housing part 91 in the height direction 1*z*. It can be seen that the first 91 and the second housing part 92 are substantially configured in the shape of a shell and connected to one another by means of screw connections 99.

As a further support element for the actuator devices and as protection against dust, a third 93 and a fourth housing part 94 are provided in the present invention with each being arranged to cover one of the actuator devices 30 or 40 on a side facing away from the respective guide elements 70 or 80. In the present invention, the third 93 and the fourth housing part 94 are substantially plate-shaped and connected to the first 91 and the second housing part 92 by means of screw connections 99.

It can be seen that a fifth housing part 95 is designed as a plastic part and arranged adjacent to the second housing part 92 in the height direction 1*z* of the control device 1, with the fifth housing part 95 being arranged so that it does not overlap with the second housing part 92 in the height direction 1*z*. In the present invention, the fifth housing part 95 is substantially frame-shaped and connected to the second housing part 92 by means of screw connections 99. In the present invention, the control lever element 1 is arranged continuously through a cut out 951 in the fifth housing part 95.

In the present invention, drive is provided via a shaft 151 of the motor 150 and the sun gear 61, with a central axis 152 of the shaft 151 being aligned in the present invention with a central axis 611 of the sun gear 61. The shaft 151 is also rigidly connected to the sun gear 61 in the present invention.

In the present invention, the shaft 151 is mounted as a drive shaft on a side facing the control lever element 10 via the mounting of the sun gear 61 and ultimately via the mounting between the annulus gear 63 and the housing 90. On a side facing away from the control lever element 10, the shaft 150 is mounted in such a way that it comes in contact with the inner ring of a roller bearing 153, the outer ring of which is mounted, for example, by means of the housing 90.

In the example shown, all gears 61, 62, 63 are made of plastic.

In the present invention, the control lever element 1 is supported by means of a Cardan joint 70, 80, which is configured as described below.

In particular, FIGS. 3*c* and 4*a* show that a first guide element 70 is arranged on a lower end 11 of the control lever element 10, which is rotatably mounted about the second axis Y and forms a first slotted guide 71, by means of which the rotation of the control lever element 10 around the first axis X can be limited to a specific first angle range.

In addition, the first guide element 70 forms a bearing 73 for rotary mounting of the lower end 11 of the control lever element 10. In the present invention, the first guide element 70 has a hole 72 through the slotted guide 71. In the present invention, the lower end 11 of the control lever element also has a hole 13, with the two holes 13, 71 being arranged in alignment with one another. In addition, a rod 52 is arranged within the two holes 13, 71 around which the control lever element 10 is rotatably arranged and which rod is rigidly connected to the first guide element 70.

Furthermore, particularly FIG. 4*a* shows that a second guide element 80 is arranged between the lower end 11 of the control lever element 10 and an upper end 12 of the control lever element 10, which second guide element is rotatably mounted about the first axis X and forms a second slotted guide 81, by means of which the rotation of the control lever element 10 about the second axis Y can be limited to certain second angle range.

In the present invention, the second guide element 80 is arranged such that it at least partially overlaps with the first guide element 70 in the height direction 1*z* of the control device 1. In the present invention, the second guide element 80 forms, for example, an arc shape 88 in some regions with a virtual central axis of the associated arc being arranged parallel to the second axis and such that it intersects the first guide element 70.

In the present invention, the first output unit 32 and the first guide element 70 as well as the second output unit 42 and the second guide element 80 are each connected by means of a web element 64; 64' (as already mentioned above). In the present invention, this web element 64 is made of plastic. The web element 64 (refer, in particular, to FIGS. 3*c* and 4*a*) is formed by means of a first end 74 or 84 of the respective guide element 70 or 80 and is rigidly connected to the remaining part of the respective guide element 70 or 80. The web element 64' (see FIGS. 4*b* and 6), however, is designed as a separate component.

Both web elements 64, 64' thus comprise multiple cylindrical projections 79, 89; 641 whose number is always three and thus corresponds to the number of the planet wheels 62 of the respective planetary gear 60. One of these projections 79, 89; 641 is in engagement with a respective hole 621, with the holes 621 being arranged centrally and continuously through the respective planet wheel 62 in axial direction of the planet wheels 62.

In the present invention, a multi-part housing 90 is provided within which the first actuator device 30, the second actuator device 40, the first guide element 70 and/or the second guide element 80 are arranged.

It is also shown that a passive reset device 110, 120, 130 is provided for the first axis X and for the second axis Y, which can be acted upon by a force when the control lever element 10 is moved, wherein the control lever element 10 is able to be returned to the default position P0 by means of a force.

The passive reset device 110, 120 thus comprises a torsion spring element which is arranged about the first axis X or the second axis Y and connected to the first guide element 70 or the second guide element 80 (not shown in the figures).

Figure 5A:
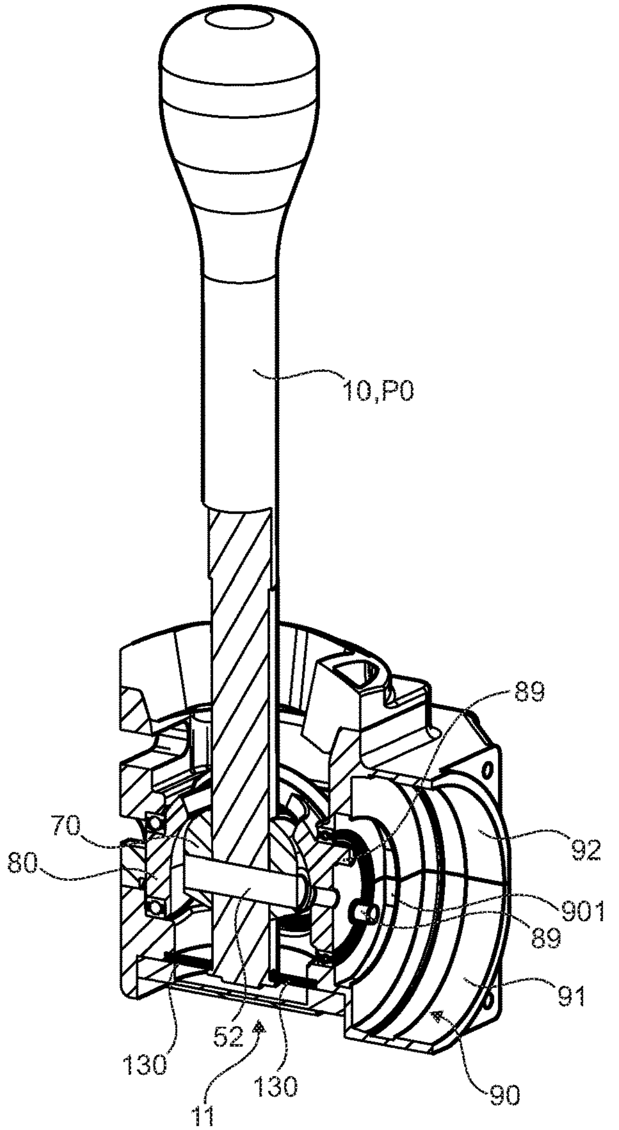
Figure 5B:
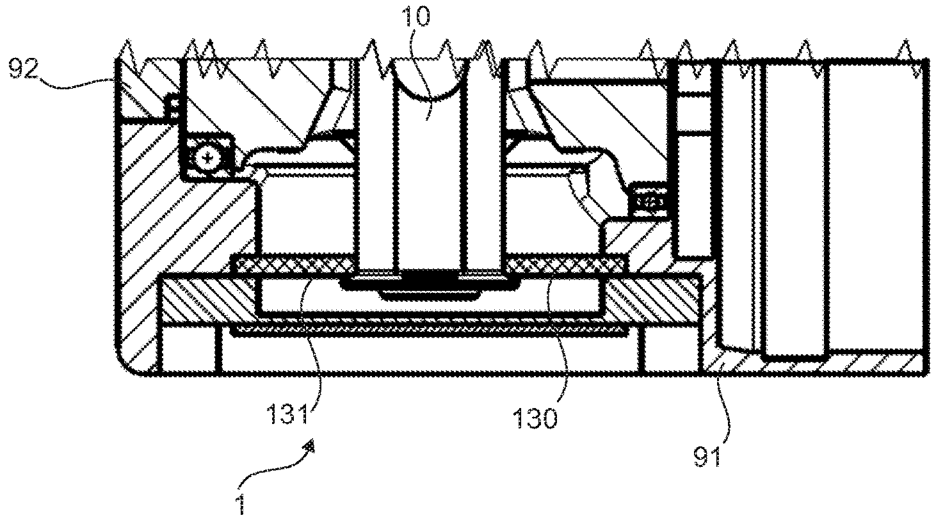

Cumulatively, the passive reset device 130 comprises a flat membrane element 131, which is arranged, at least in the default position P0 of the control lever element 10, perpendicular to a longitudinal extension 10*z* of the control lever element 10 and connected to the housing 90 and the lower end 11 of the control lever element 10 in a biased manner (refer to FIGS. 5*a* and 5*b*).

In addition, a locking device 140 is arranged, which can be brought into engagement with the control lever element 10 and by means of which a movement of the control lever element 10 about at least one of the axes X, Y can be mechanically limited, wherein, in the present invention, a position of the locking device 140 is designed to be adjustable. The locking device 140 thus forms an adjustment member for the displacement of the control lever element 10, which is arranged in a plane parallel to the first axis X and the second axis Y, wherein the locking device 140 is movably arranged within this plane.

In the present invention, the locking device 140 can be brought into engagement with a first locking element 87 for the first axis X and with a second locking element 77 for the second axis Y. In the present invention, the first 87 and the second locking element 77 are designed as a locking lug, i.e. said element is provided with a projection, wherein the projection is able to be brought into engagement with the locking device 140, in particular with the adjustment member of the locking device 140. The first locking element 87 is arranged at a second end 85 of the second guide element 80. The second locking element 77 is arranged at a second end 75 of the first guide element 70 (also refer to FIG. 2*c*). In the present invention, the second end 75 or 85 is arranged so that it faces away from the respective output unit 32.

Figure 7:
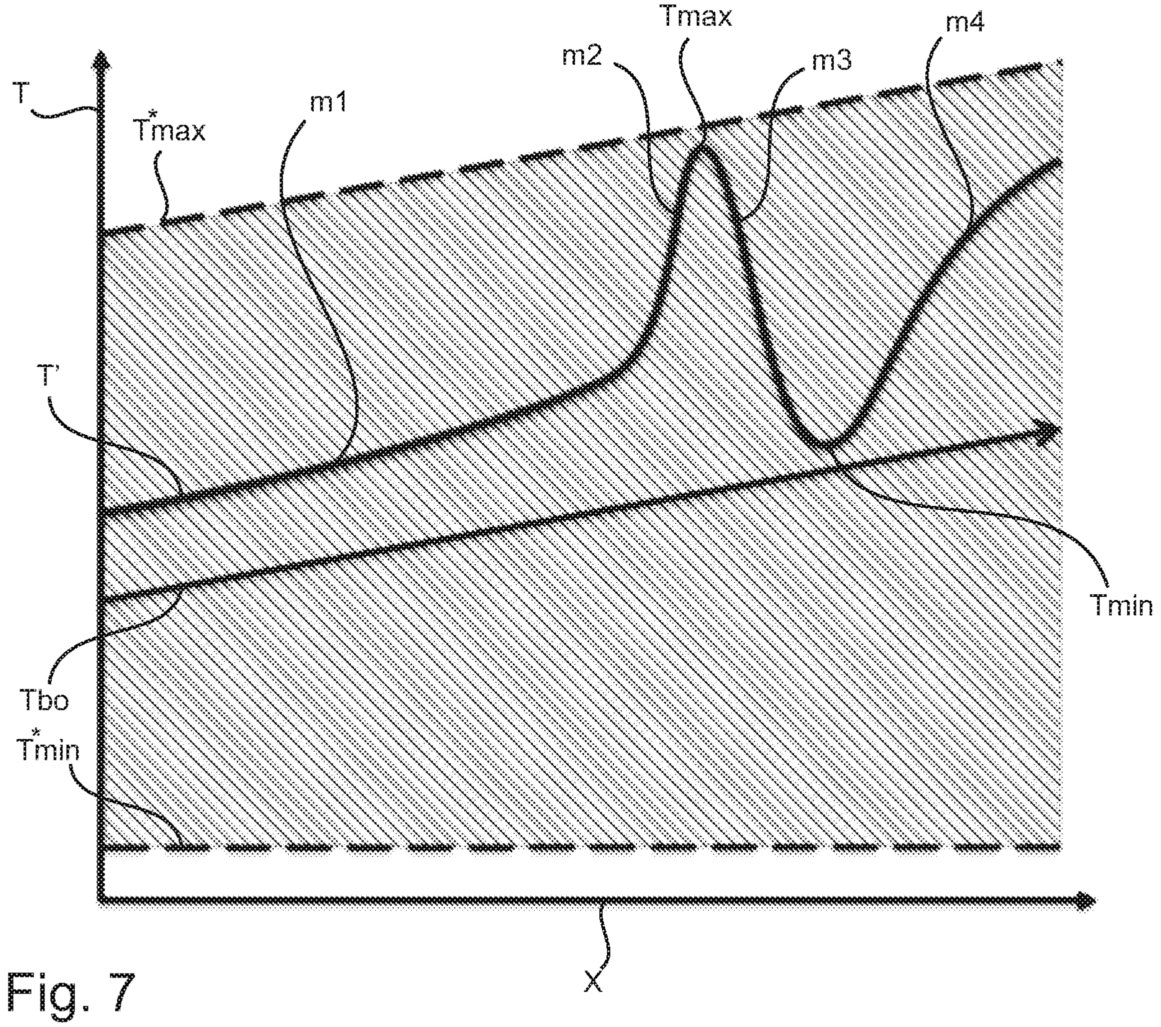
FIG. 7 shows a graphic illustration of the assistance or instructions provided by the actuator devices to the driver.

FIG. 7 shows a possible course of the torque T' ("torque") depending on the adjustment path x ("travel") or the displacement path of the control lever element on the basis of a diagram with the axes T for torque and x for the travel. For the sake of simplicity, the latter is to be equated with a pivoting angle of the control lever element.

This figure shows the torque limits T*min, T*max of the present arrangement, namely a minimum application torque T*min and a maximum application torque T*max. The latter corresponds to at least twice the break-out torque Tbo, i.e. the maximum torque required to break an existing adhesive connection. A value known in practice for this breakout torque (also called friction torque) is typically 1.5 Nm.

As can be seen, all the values of the example curve T' lie between the graphs (lines) for the break-out torque Tbo and the maximum torque T*max to be applied. According to the example curve T', the torque T initially increases approximately linearly or with a slight slope m1.

When a certain distance is reached, the torque T increases with a steep slope m2 to a maximum value Tmax and then decreases with a negative slope m3, which is also steep in terms of its degree, to a torque Tmin, which, in the present invention, has the lowest value within the example curve T'. The torque then increases again with a steep slope m4.

It is therefore conceivable here that the control device is programmed in such a way that, depending on the distance travelled x or depending on the respective travel section, it either actively opposes the driver (refer to the areas with the slopes m2, m4) or actively supports the driver (refer to the areas with the slopes m3). On the one hand, this serves to warn the driver of a danger (as described above); however, it can also inform the driver by means of the abrupt change in torque that, by leaving a first travel segment, a first work level is now left as well and a second work level is started when a second travel segment is entered. This means for the driver, for example, that additional damping devices on the excavator are now switched on or have to be switched on.

All the features disclosed in the application documents are claimed as being essential to the invention, either individually or in combination, provided that they are novel over prior art.

LIST OF REFERENCE SIGNS

1 Control device
10 Control lever element
11 Lower end
13, 72 Hole
20 Cardan joint
30, 40 Actuator device
32, 42 Output unit
34, 44 Drive unit
50, 51 Sensor
52 Rod
60 Planetary gear
61 Sun gear
62 Planet wheel
63 Annulus gear
64,64' Web element
70, 80 Guide element
71 81 Slotted guide
73 Bearing
77 87 Locking element
79, 89, 641 Projection
88 Arc shape
90 Housing
91, 92, 93, 94, 95 Housing part
99 Screw connection
110, 120, 130 Reset device
131 Membrane element
140 Locking device
150 Electric motor
151 Shaft
152, 611 Central axis
153 Roller bearing
230, 240 Electrical connection
300 Control signal
400 Input signal
621 Hole
631, 901 Flat region
761, 762', 861, 862' Bearing
951 Cutout
CU Electronic control unit
P0 Default position
X, Y Axis
V Vehicle

What is claimed is:

1. A manually operable control device for operating at least one actuator of a vehicle, comprising:

a manually operable control lever element that is displaceable from a default position by a rotation about at least one of a first axis, a second axis, or both a first axis and a second axis;

a sensor device, wherein at least one of a degree, a direction, or both a degree and a direction of a corresponding displacement of the control lever element is detectable by the sensor device;

at least one first actuator device, the first actuator device including:

a first drive unit and a first output unit, wherein the first drive unit includes a first electric motor, wherein the first output unit includes a first planetary gear, and wherein, the first actuator device applies a first torque to the control lever element along the first axis; and a second actuator device, the second actuator device including:

a second drive unit and a second output unit, wherein the second drive unit includes a second electric motor, wherein the second output unit includes a second planetary gear, and wherein, the second actuator device applies a second torque to the control lever element along the second axis, and wherein the first output unit is rotatably mounted about the first axis and the second output unit is rotatably mounted about the second axis.

2. The manually operable control device according to claim 1, wherein the first and second planetary gears each include a sun gear, arranged in alignment with and rotatably mounted about one of the first axis or the second axis, an annulus gear radially surrounding the sun gear, and multiple planet wheels radially arranged between and intermeshed with the sun gear and the annulus gear.

3. The manually operable control device according to claim 1, wherein a first guide element is arranged at a lower end of the control lever element, wherein the first guide element is rotatably mounted about the second axis and forms a first slotted guide, and wherein the first slotted guide limits the rotation of the control lever element about the first axis to a specific first angle range.

4. The manually operable control device according to claim 3, wherein—the first guide element forms a bearing for a rotary mounting of the lower end of the control lever element.

5. The manually operable control device according to claim 3, wherein a second guide element is arranged between a lower end of the control lever element and an upper end of the control lever element, wherein the second guide element is rotatably mounted about the first axis and forms a second slotted guide, and wherein the second slotted guide limits the rotation of the control lever element about the second axis being a specific second angle range.

6. The manually operable control device according to claim 3, wherein the first output unit and the first guide element are each connected by means of a web element.

7. The manually operable control device according to claim 1, wherein a multi-part housing is provided, within which the first actuator device, the second actuator device, a first guide element or a second guide element are arranged.

8. The manually operable control device according to claim 1, wherein at least one passive reset device is provided for one or both of the first axis and the second axis, wherein passive reset device can be acted upon by a force when the control lever element is displaced, and where the control lever element is returnable to a default position by means of the force.

9. The manually operable control device according to claim 8, wherein the passive reset device includes a torsion spring element, and wherein the torsion spring element is arranged about the first or the second axis and is connected to a first guide element or a second guide element.

10. The manually operable control device according to claim 8, wherein the passive reset device includes a flat membrane element arranged, at least in the default position of the control lever element perpendicular to a longitudinal extension of the control lever element and connected with a housing and a lower end of the control lever element in a biased manner.

11. The manually operable control device according to claim 1, further comprising:

a locking device, wherein the locking device can be brought into engagement with the control lever element, and wherein the locking device mechanically limits a displacement of the control lever element about at least one of the axes.

* * * * *